US 11,051,538 B2

(12) United States Patent
Elabbadi et al.

(10) Patent No.: US 11,051,538 B2
(45) Date of Patent: Jul. 6, 2021

(54) PLATED FLAVOR POWDERS

(71) Applicant: FIRMENICH SA, Satigny (CH)

(72) Inventors: Amal Elabbadi, Geneva (CH); Philipp Erni, Geneva (CH)

(73) Assignee: Firmenich SA, Satigny (CH)

( * ) Notice: Subject to any disclaimer, the term of this patent is extended or adjusted under 35 U.S.C. 154(b) by 384 days.

(21) Appl. No.: 14/901,372

(22) PCT Filed: Jun. 24, 2014

(86) PCT No.: PCT/EP2014/063214
§ 371 (c)(1),
(2) Date: Dec. 28, 2015

(87) PCT Pub. No.: WO2014/206956
PCT Pub. Date: Dec. 31, 2014

(65) Prior Publication Data
US 2017/0150746 A1 Jun. 1, 2017

Related U.S. Application Data

(60) Provisional application No. 61/839,730, filed on Jun. 26, 2013.

(51) Int. Cl.
A23L 27/20 (2016.01)
A23L 27/00 (2016.01)
A23P 10/35 (2016.01)
A23P 10/40 (2016.01)
A23G 4/06 (2006.01)
A23L 27/60 (2016.01)
A23L 9/10 (2016.01)

(52) U.S. Cl.
CPC ........... *A23L 27/2028* (2016.08); *A23L 27/70* (2016.08); *A23L 27/72* (2016.08); *A23L 27/80* (2016.08); *A23P 10/35* (2016.08); *A23P 10/40* (2016.08); *A23G 4/06* (2013.01); *A23L 9/10* (2016.08); *A23L 27/60* (2016.08); *A23V 2002/00* (2013.01)

(58) Field of Classification Search
CPC ...... A23L 27/2028; A23L 27/80; A23L 27/72; A23L 27/70; A23L 27/60; A23L 9/10; A23P 10/35; A23P 10/40; A23G 4/06; A23V 2002/00
USPC .......................... 426/650, 534, 443, 455, 456
See application file for complete search history.

(56) References Cited

U.S. PATENT DOCUMENTS

| 5,370,881 | A | 12/1994 | Fuisz | |
|---|---|---|---|---|
| 2002/0122870 | A1* | 9/2002 | McBride | A23G 9/52 426/651 |
| 2006/0263474 | A1* | 11/2006 | Luo | A23G 4/066 426/3 |
| 2007/0082101 | A1 | 4/2007 | Wiesmuller | |

FOREIGN PATENT DOCUMENTS

| GB | 1065655 A | 4/1967 |
|---|---|---|
| GB | 1324056 A | 7/1973 |
| WO | WO2011/000524 A1 | 1/2011 |

OTHER PUBLICATIONS

International Search Report and Written Opinion, application PCT/EP2014/063214, dated Aug. 26, 2014.
Bolton and Reineccius (1991), Perfumer & Flavorist, vol. 17, No. 2, p. 2.

* cited by examiner

*Primary Examiner* — Leslie A Wong
(74) *Attorney, Agent, or Firm* — Armstrong Teasdale LLP

(57) ABSTRACT

A flavor composition of a mixture of a) a first powder that includes a liquid flavor having a log P of up to about 3.5 loaded onto a first solid matrix material; and b) a second powder that includes a solvent loaded onto a second solid matrix material. The second solid matrix material is different than first solid matrix material and the flavor composition is in the form of a free-flowing powder. Also, methods of making a plated flavor powder and food compositions that include the powder.

8 Claims, 1 Drawing Sheet

PLATED FLAVOR POWDERS

This application is a 371 filing of International Patent Application PCT/EP2014/063214 filed Jun. 24, 2014, which claims the benefit of U.S. provisional patent application No. 61/839,730 filed Jun. 26, 2013.

TECHNICAL FIELD

The technical field relates to powder compositions comprising flavors that are retain during processing.

BACKGROUND

Loading liquid flavors onto solid matrix materials is a traditional method to prepare flavor powders. The procedure is called powder/liquid blending, and the terms "loading" or "plating" is used to describe such liquid loading processes, with the resulting flavor powder called a 'plated powder' or a 'plated flavor'. Unlike more costly encapsulated flavors, such as spraydried flavors or flavor capsules prepared by melt extrusion, it is well-known that plated flavor powders do not provide good protection against loss of the flavor against evaporation (see for example Bolton and Reineccius (1991), Perfumer & Flavorist, Volume 17, No. 2, p 2, and Bouquerand et al (2012), in Encapsulation technologies and delivery systems for food ingredients and nutraceuticals, Garti & McClements (Eds.), Woodhead Publishing, Cambridge UK, ISBN 0 85709 124 7). For example, in publication US 2007/0082101 (paragraph 14) stabilities of the order of hours or days are mentioned, which in the field of flavor application is an undesirably short period of time and would lead to unacceptable shelf life.

The problem of flavor loss in plated flavor powders has therefore not been solved, as suggested for example by publication WO2011000524 (Cargill, Inc.) and therefore it is desirable to have a flavor powder with improved flavor retention.

SUMMARY

Provided herein is a a flavor composition comprising a mixture of: a) a first powder comprising a liquid flavor having a log P of up to about 3.5 loaded onto a first solid matrix material; and b) a second powder comprising a solvent loaded onto a second solid matrix material wherein the second solid matrix material is different than the first solid matrix material and wherein the flavor composition comprises a free-flowing powder.

DETAILED DESCRIPTION

Figure 1:
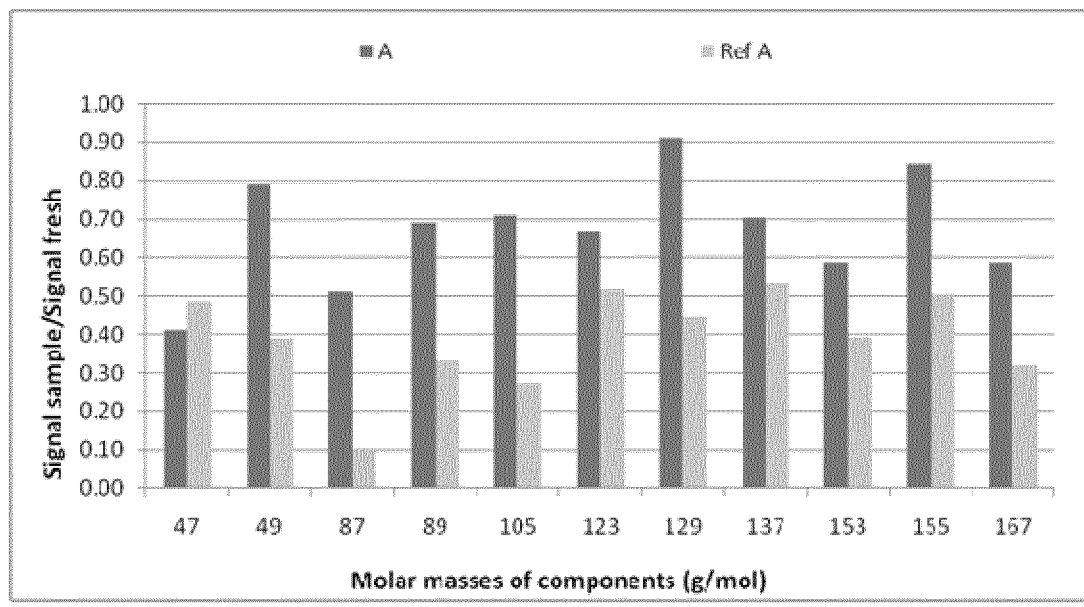
FIG. 1 shows headspace results, illustrating the improved retention of the flavor in the composition. Dark columns are for the flavor powder prepared according to the invention, light-gray columns are for a reference traditional flavor powder prepared by regular powder blending.

For the descriptions herein and the appended claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

In one embodiment provided herein the first solid matrix material is selected from the group consisting of dextrin, starch, hydrophobically modified starch, vegetable flours, sugars, table salt, calcium carbonate, calcium phosphate, water-soluble sweeteners, flavor modifiers or taste enhancers. In a further embodiment, the second solid matrix material is selected from the group consisting of microcrystalline cellulose, silicon dioxide, clay powder, or a solid food ingredient with a water solubility below 100 mg/L.

In a yet further embodiment, the solvent of the second powder comprises a solvent selected from the group consisting of propylene glycol, water, aqueous solutions of organic acids, aqueous salt solutions, ethanol, glycerol, or mixtures thereof. In a particular embodiment, the solvent comprises propylene glycol.

Also provided herein is a composition wherein the liquid flavor is loaded onto the first solid matrix material in conjunction with a carrier solvent wherein the carrier solvent is different than the solvent coated onto the second matrix material and wherein the carrier solvent has a log P equal to or greater than about 0.25.

In a particular embodiment, the carrier solvent comprises a liquid selected from the group consisting of vegetable oils, isopropyl myristate, polyunsaturated fatty acids, polyoxyethylene (20) sorbitan monooleate, sorbitan trioleate, lecithin, triacetin, ethyl acetate, triethyl citrate, isopropanol, benzyl alcohol, or mixtures thereof. Particularly the carrier solvent comprises a liquid selected from a medium chain triglyceride oil or triacetin. More particularly the carrier solvent comprises a medium chain triglyceride.

In a more particular embodiment, a composition is provided wherein the carrier solvent comprises a medium chain triglyceride oil, the solvent comprises propylene glycol, the first solid matrix material comprises maltodextrin, and the second solid matrix material comprises microcrystalline cellulose. Further provided herein is a method of making a free-flowing flavor composition comprising: a) loading a flavor onto a first solid matrix material to form a flavor plated particle; b) mixing a solvent with a second solid matrix material to form a solvent plated particle; and c) mixing the flavor plated to particle with the solvent plated particle to form a free-flowing particle. In one embodiment, a flavor composition comprises a mixture of a) a first powder comprising a liquid flavor having a log P of up to about 3.5 loaded onto a first solid matrix material; and b) a second powder comprising a solvent loaded onto a second solid matrix material wherein the second solid matrix material is different than the first solid matrix material and wherein the flavor composition comprises a free-flowing powder; wherein the first powder is prepared by mixing the liquid flavor and the first solid matrix material to form a flavor plated particle, wherein the second powder is prepared by mixing the solvent and the second solid matrix material to form a solvent plated particle, wherein the flavor composition is prepared by mixing the first powder and the second powder to form free-flowing particles. In a further embodiment the free-flowing particle has enhanced flavor retention as compared to a plated powder formulation not having a particle or powder comprised of a solvent plated onto a second solid matrix material.

Loading of solid matrix materials with liquid flavor or with solvent can be carried out by any method for powder blending known in the art (described for example in the publication Bolton and Reineccius (1991), Perfumer & Flavorist, Volume 17, No. 2, p 2). Preferably, the procedure is performed at the industrial scale using a powder blender that allows intimate mixing of solid and liquid ingredients. The liquid can be poured or dripped directly onto the solid matrix material, or it can be sprayed onto the solids with a nozzle. Powder blending equipment is available, for example, from Loedige Process Technology, Germany, or from Amixon GmbH, Germany. The first powder comprises a liquid flavor loaded onto a first solid matrix material. In another embodiment provided herein the liquid flavor comprised in the first powder is loaded onto the first solid matrix material in conjunction with a carrier solvent. The flavor composition of the present invention can be formulated to include several components including the liquid flavor, the first solid matrix material, the solvent, the second solid matrix material, or the carrier solvent, and various combinations of said flavor composition should be optimized based on the desired characteristics of the flavor composition as demonstrated in examples 1-4, preferably using a powder blender to allow intimate mixing of solid and liquid ingredients at the industrial scale.

In another embodiment provided herein, the first powder in the flavor composition comprises:

a) a first powder comprising a liquid flavor having a log P of up to about 3.5, loaded onto a first solid matrix material; and b) a protective coating material coated onto the first powder wherein said protective coating material is selected from the group consisting of a film-forming water-soluble material and a film-forming material soluble in a mixture of water and another polar solvent such as isopropanol, ethanol, propylene glycol.

In a further embodiment, the second powder comprises a solvent loaded onto a second solid matrix material wherein the second solid matrix material is different than the first solid matrix material.

In a further embodiment provided herein, the film-forming material is selected in the group consisting of proteins, polysaccharides, foodgrade resins, waxes, tannins, edible polymer, or mixtures thereof. The film-forming material can also be a mixture of those materials. By "film forming material" it is meant here a polymeric or particulate material that can be provided in the form of a liquid solution or dispersion and that forms a solid, contiguous or continuous film upon removal of the solvent. Examples of such film-forming materials include but are not limited to zein, whey proteins, soy proteins, caseins, maltodextrins, ethylcellulose, alginate, chitosan, shellac, tannic acid, gum arabic, or mixtures thereof.

The protective coating layer can be coated onto the particles by a variety of methods with known industrial feasibility, including powder mixing using industrial powder blending equipment, or spray coating using fluidized bed equipment.

By "flavor or flavoring composition", it is meant here a flavoring ingredient or a mixture of flavoring ingredients, solvents or adjuvants of current use for the preparation of a flavoring formulation, i.e. a particular mixture of ingredients which is intended to be added to an edible composition or chewable product to impart, improve or modify its organoleptic properties, in particular its flavor and/or taste. Flavoring ingredients are well known and many of these flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, van Nostrand Co., Inc. Solvents and adjuvants of current use for the preparation of a flavoring formulation are also well known in the art. Particularly a flavor having a log P of about 0.3 up to about 3.5 is provided in the flavor powders describe herein.

In a particular embodiment the flavor is a mint flavor. In a more particular embodiment, the mint is selected from the group consisting of peppermint and spearmint.

In a further embodiment the flavor is a cooling agent or mixtures thereof.

In another embodiment, the flavor is a menthol flavor.

Flavors that are derived from or based on fruits where citric acid is the predominant, naturally-occurring acid include but are not limited to, for example, citrus fruits (e.g., lemon, lime), limonene, strawberry, orange, and pineapple. In one embodiment, the flavors food is lemon, lime or orange juice extracted directly from the fruit. Further embodiments of the flavor comprise the juice or liquid extracted from oranges, lemons, grapefruits, key limes, citrons, clementines, mandarins, tangerines, and any other citrus fruit, or variation or hybrid thereof. In a particular embodiment, the flavor comprises a liquid extracted or distilled from oranges, lemons, grapefruits, key limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

In a particular embodiment, the flavor comprises a composition that comprises limonene, in a particular embodiment, the composition is a citrus that further comprises limonene. In another particular embodiment, the flavor comprises a flavor selected from the group comprising strawberry, orange, lime, tropical, berry mix, and pineapple.

In a particular embodiment, the flavor comprises a composition to flavor a savory or salty food or snack, including, but not limited to, flavors associated with meat, such as beef, chicken or pork, or with fish and seafood. The flavor may comprise a spice or a composition of spices, herbs, cheese, yeast or yeast extracts, protein hydrolysates, seasonings, or extracts of smoke. Savory flavor tonalities include but are not limited to beef, pork, bacon, ham, poultry, French fries, cheese, pepper, chili, nacho, jalapeno, onion, garlic, tomato, paprika, coriander, nuts, umami, and may possess roasted, cooked, grilled, smoked, burnt or caramel notes.

The phrase flavor includes not only flavors that impart or modify the smell of foods but include taste imparting or modifying ingredients. The latter do not necessarily have a taste or smell themselves but are capable of modifying the taste that other ingredients provides, for instance, salt enhancing ingredients, sweetness enhancing ingredients, umami enhancing ingredients, bitterness blocking ingredients and so on.

The dry particles or powder provided herein may be suitable for conveying flavors to beverages, fluid dairy products, condiments, baked goods, frostings, bakery fillings, candy, chewing gum and other food products.

Also provided herein is a food composition or article comprising a flavor composition as described above wherein the food composition is selected from the group consisting of beverages, fluid dairy products, condiments, baked goods, frostings, bakery fillings, candy, chewing gum and other food products.

Beverages include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation techniques.

Fluid dairy products include, without limitation, non-frozen, partially frozen and frozen fluid dairy products such as, for example, milks, ice creams, sorbets and yogurts. Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and nonfat to full-fat fillings. In a further aspect, the carrier solvent in the first powder is characterized by being more oil-like (non-polar) than the solvent present in the second powder. This difference is conveniently expressed using the log P value. Log P values characterize the partitioning of compounds in oil/water environments; the value is defined as the decadic logarithm of the octanol/water partition coefficient, and values can be easily obtained using standard software.

EXAMPLES

Example 1

A flavor composition formulated based on a medium chain triglyceride oil (MCT, solvent A) was filled into a open beaker, and was then placed inside a closed glass container containing a powder consisting of 20% propylene glycol (PG, solvent B) plated onto 80% of microcrystalline cellulose (MCC; purchased from Sigma Aldrich). Then the system was stored in the lab at room temperature. After 6 days, a small sample of powder was removed, an extraction experiment was performed and the extract was analyzed by GC/MS.

Extraction solvent: cyclohexane

Internal standard: Methyloctanoate (a 6.67 mg/ml solution was prepared by dissolution in cyclohexane)

2 extractions were performed to check the reproducibility. Table 1 presents an overview of the extraction measurements.

TABLE 1

|  | m(powder), mg | Cyclohexane addition (ml) | Internal standard soln (ul) |
| --- | --- | --- | --- |
| extract 1 | 324.8 | 2 | 100 |
| extract 2 | 308.3 | 2 | 100 |

The results show that a part of the volatiles initially in the liquid flavor composition transferred toward the PG plated onto the MCC, via the headspace.

The headspace analysis of the flavor captured in the solvent-loaded flavor particles is presented in Table 2.

TABLE 2

| Name | Log P | Avg conc in powder (ppm) | Avg conc in the PG (ppm) | (conc in PG/conc in initial oil)*100 |
| --- | --- | --- | --- | --- |
| isovalerianic aldehyde | 1.23 | 273 | 1091.5 | 9.1 |
| 2-methyl butanal | 1.23 | 404 | 1615.4 | 6.7 |
| acetylmethylcarbinol | −0.36 | 39 | 156.9 | 3.9 |
| 3-(methylthio)propanal | 0.41 | 28 | 113.5 | 2.8 |
| 2-ethyl-3-methylpyrazine | 1.07 | 200 | 799.0 | 39.9 |
| 2-ethyl-3,5-dimethylpirazine | 2.07 | 6 | 25.4 | 12.7 |
| Decenal | 3.55 | 9 | 37.8 | 0.3 |
| Dienal C10 | 3.33 | 117 | 467.4 | 1.9 |
| Dienal C11 | 3.82 | 10 | 40.4 | 0.5 |

The values in the last column of Table 2 demonstrate the affinity that the different volatiles have for propylene glycol (Solvent B) as compared to partitioning into medium chain triglyceride oil (solvent A) or air: the higher this value, the more of this molecule transferred to the PG as compared to its initial amount in the flavor composition.

These values are related to the log P values of the volatiles. In the example provided here, molecules with a log P value between 0.3 and 3.5 are therefore selectively captured in the flavor powder as prepared according to invention, whereas they are lost in a regular, traditional loaded powder of the same flavor onto a single, traditional carrier material.

The propylene glycol appears to re-solubilize volatile molecules evaporated in the headspace and therefore retain them in the liquid/powder mixture.

Example 2

Preparation of a Flavor Powder

A flavor composition was prepared by mixing a liquid flavor with medium chain triglyceride as the solvent ("F1"), wherein the medium chain triglyceride is a carrier solvent of a first powder of a flavor composition of the present application. A flavor composition was prepared by mixing a liquid flavor with triacetin as the solvent ("F2"), wherein the triacetin is a carrier solvent of a first powder of a flavor composition of the present application. Powder A was prepared by mixing F1 with maltodextrin in a 50:50 ratio a mortar (equal masses of maltodextrin particles and F1), wherein the maltodextrin is a first solid matrix material of a first powder of a flavor composition, wherein powder A is a first powder of a flavor composition of the present application. Powder B was prepared by mixing F2 with maltodextrin in a 50:50 ratio in a mortar (equal masses of maltodextrin particles and F2), wherein the maltodextrin is a first solid matrix material of a first powder of a flavor composition, wherein powder B is a first powder of a flavor composition of the present application. Powder C was prepared by mixing microcrystalline cellulose and propylene glycol in an 80:20 ratio respectively in a mortar (4 parts of MCC particles and 1 part of PG, i.e. MCC/PG particles), wherein the microcrystalline cellulose (MCC) is a second solid matrix material of a second powder of a flavor composition, wherein the propylene glycol (PG) is a solvent of a second powder of a flavor composition, wherein powder C is a second powder of a flavor composition of the present application. Sample A was obtained by mixing in a mortar equal masses of powders A and C, wherein sample A is a flavor composition of the present application comprising a first powder (powder A) and a second powder (powder C). Sample B was obtained by mixing in a mortar equal masses of powders B and C, wherein sample B is a flavor composition of the present application comprising a first powder (powder B) and a second powder (powder C). Additionally, reference samples A and B having the same flavor concentration but not containing MCC/PG particles were prepared, wherein the reference samples A and B do not contain a second powder, i.e. powder C.

Sample Ref-A was obtained by mixing in a mortar equal masses of powder A and Maltodextrin.

Sample Ref-B was obtained by mixing in a mortar equal masses of powder B and Maltodextrin.

Table 3 presents an overview of formulations of flavor powders prepared for comparison.

TABLE 3

|  | F1 | | F2 | |
| --- | --- | --- | --- | --- |
|  | Ref-A | A | Ref-B | B |
| % flavor | 25 | 25 | 25 | 25 |
| % Maltodextrin | 75 | 25 | 75 | 25 |
| % MCC | 0 | 40 | 0 | 40 |
| % PG | 0 | 10 | 0 | 10 |

The 4 samples were then transferred in screwed-cap vials and stored at room temperature. They were analyzed after 1 month to assess their flavor content. For comparison, freshly prepared samples were prepared exactly the same way before the analyses for comparison.

A precise mass between 50-100 mg of powder was dispersed in 100 ml of warm water (60° C.) in 500-ml glass bottles equipped with caps having an opening of 5 mm on top for the measurement probe introduction. The opening was initially kept closed, and after dispersion in water and equilibration for 1.5 minute, was opened to introduce the probe and measure the headspace for 50 seconds (flow rate of aspiration: 31 ml/min). This procedure was followed rigorously the same for all the samples measured.

The headspace was analyzed by a mass spectrometer, which detected the different volatiles and their amount.

For each sample, the signal measured for each volatile was normalized by the signal measured for the same volatile in the fresh sample. We could therefore determine the % volatile remaining in the powder after 1 month storage.

Table 4 and FIG. 1 present the headspace results that is the proportion of volatile remaining as compared to the reference sample (signal sample/signal reference).

TABLE 4

| Mass (g/mol) | Ref-A | A | Ref-B | B |
| --- | --- | --- | --- | --- |
| 47 | 0.49 | 0.41 | 0.66 | 0.00 |
| 49 | 0.39 | 0.79 | 0.75 | 0.87 |
| 87 | 0.10 | 0.51 | 0.39 | 0.53 |
| 89 | 0.33 | 0.69 | 0.78 | 0.90 |
| 105 | 0.27 | 0.71 | 0.74 | 1.02 |
| 123 | 0.52 | 0.67 | 0.79 | 0.83 |
| 129 | 0.45 | 0.91 | 0.81 | 0.91 |
| 137 | 0.53 | 0.70 | 0.84 | 0.87 |
| 153 | 0.39 | 0.59 | 0.70 | 0.70 |
| 155 | 0.50 | 0.85 | 0.82 | 0.82 |
| 167 | 0.32 | 0.59 | 0.66 | 0.71 |

The molar masses in the left column of table 4 represent the characteristic fragments of the volatiles detected by the mass spectrometer. The values given in the table are the result, for each molecule, of the signals ratio Sample/Fresh. In conclusion, measurement of the volatiles released in the headspace showed that especially in the case of the medium chain triglyceride-based flavor (F1), the presence of MCC/PG particles resulted in at least twice as much volatiles being retained as compared to the reference sample not containing MCC/PG.

A similar, but slightly weaker effect was observed with samples containing F2 (formulated in triacetin, instead of MCT). This is due to the higher polarity of triacetin as compared to MCT, which enables to retain more polar volatiles.

The following examples are illustrative only and are not meant to limit the scope of invention as set forth in the Summary, Description or in the Claims.

Example 3

Storage Stability of Flavor Powders

A flavor powder prepared according to Example 2 was compared to a traditional powder prepared with the same flavor with respect to volatile retention. This test was performed over several months by storing the powders in air in three different environments: 1. in hermetically closed vials (50 ml containers filled halfway with powder), 2. in semi-open vials (same containers, but with ten pores of diameter 0.5 mm punctured in the cap), and in completely open containers (petry dishes). All the samples were placed in a ventilated cupboard at a temperature of 23[deg] C.

The powder compositions were as follows:

|  | Sample | Reference |
| --- | --- | --- |
| % flavor | 25 | 25 |
| % maltodextrin | 25 | 75 |
| % microcrystalline cellulose | 40 | 0 |
| % propylene glycol | 10 | 0 |

After 9 months, headspace analysis was performed on both closed and semi-open samples, and compared with their fresh counterparts stored in a refrigerator at a temperature of 5[deg] C. for 9 months.

The results show that the the loss of flavors (volatiles) form the powders prepared above was significantly reduced as compared to the reference samples.

Figure 2:
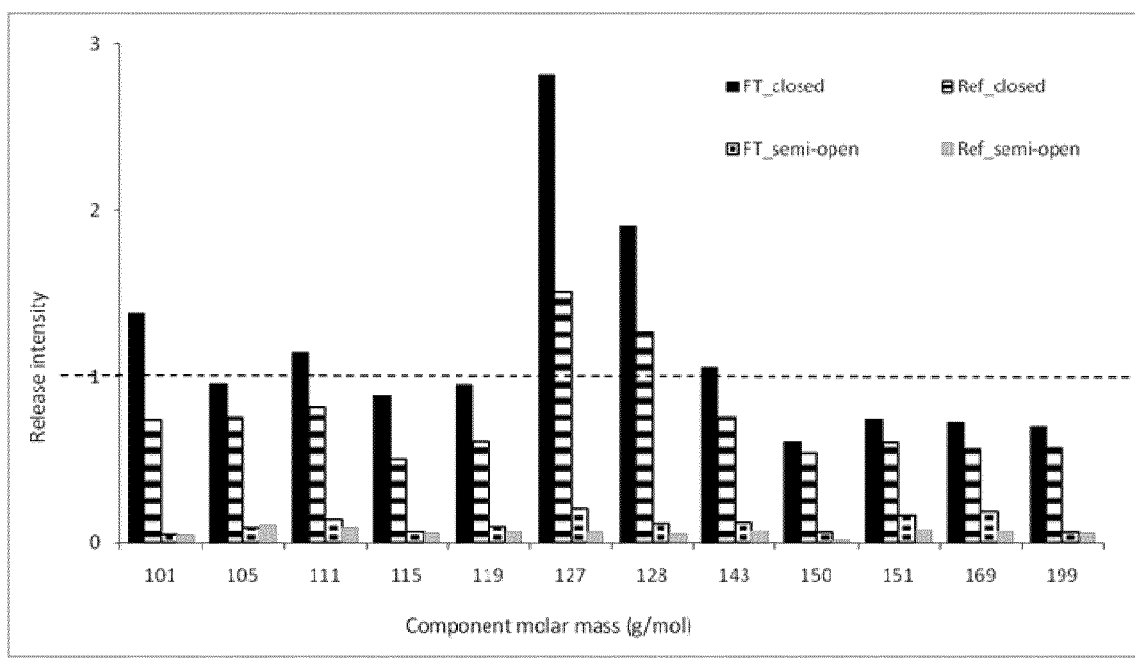
FIG. 2 shows results from storage stability test using headspace measurement of flavor released from powders dissolved in warm water (temperature: 60[deg] C.). Each sample had been stored for 9 months at room temperature either in closed or in semi-open containers.

FIG. 2 shows results from headspeace measurements of flavor released from powders dissolved in warm water of temperature 60[deg] C. Each sample had been stored for 9 months at room temperature either in closed or in semi-open containers. The measured intensity for each component was normalized by the component intensity measured in the fresh counterpart. The comparison clearly shows that the powder prepared according to the processes described herein retained up to twice as much volatile as in the reference powder (depending on the molecular mass of the compound).

In conclusion, as compared to the reference samples, flavor powders prepared according to the processes described herein enabled better retention with all molecular weights. Even in the semi-open containers, the volatile retention was up to three times better as compared to the reference.

Example 4

Preparation of a Flavor Powder

This example describes the preparation of a flavor powder comprising a mixture of a first powder comprising a liquid flavor loaded onto a first type of solid particles; and a second powder comprising a solvent loaded onto a second type of solid particles. In this example, the particles comprised in the first powder are additionally coated by a protective coating layer. Several film-forming materials (polysaccharide, proteins, or mixture thereof, resins, waxes, tannins, lignin, lignocelluloses, and other film-forming polymers) were used. Examples that are particularly suitable include zein, whey proteins, casein as proteins; ethylcellulose, alginate, chitosan as poylsaccharides; shellac as a natural resin; tannic acid or gum arabic.

Solutions of gum arabic were prepared by dispersing and hydrating 15 wt. % (solution 4A) and 35% (solution 4B) of gum arabic (obtained from CNI, France) in deionized water. The first powder (limonene as a model liquid flavor, loaded onto microcrystalline cellulose particles at a flavor load of 10 wt. %) was prepared as in Example 2, and the gum arabic solution was then blended onto this intermediate flavor powder with a kitchen blender. Additionally, for small batches, mortar and pestle were used for blending. Optionally, a spray nozzle can be used to spray the gum arabic solution onto the powder, however, this is limited by the viscosity of the polymer solution (a 15 wt:% gum arabic solution can be sprayed easily). The powders were left to dry overnight in the blending vessel. For another batch, the same first powder (limonene loaded onto microcrystalline cellulose particles) was coated with zein (obtained from Sigma-Aldrich). A zein dispersion was prepared at a concentration of 9.6 wt. % in a mixture of isopropanol/water 80/20 w/w and blended onto the powder.

Preparation and addition of the second powder can be performed as in Example 2.

The samples prepared here were compared to simple plated flavors (limonene loaded onto microcrystalline cellulose), and compared organoleptically at 1 day and 2 weeks following preparation. The reference samples had lost all their flavor and no flavor release could be detected upon dispersion of the product in 60 [deg] water, whereas the powder as prepared according to the processes described herein displayed a prolonged retention of the flavor.

What is claimed is:

1. A plated flavor composition having improved retention of a liquid volatile flavor, comprising a mixture of
    a) a first dry powder comprising the liquid flavor having a log P of up to about 3.5 loaded onto a first solid matrix material comprising maltodextrin, wherein the liquid flavor is loaded onto the first solid matrix material in conjunction with a carrier solvent, wherein the carrier solvent has a log P equal to or greater than about 0.25, wherein the first dry powder comprises solid particles loaded with a liquid flavor and wherein said particles are further coated with a film-forming material; and
    b) a second dry powder comprising a solvent loaded onto a second solid matrix material comprising microcrystalline cellulose, wherein the second solid matrix material is different than the first solid matrix material,
    wherein the flavor composition is in the form of a free-flowing powder, and wherein the carrier solvent is different than the solvent loaded onto the second solid matrix material.

2. The composition as recited in claim 1 wherein the solvent comprises a liquid selected from the group consisting of propylene glycol, water, aqueous solutions of organic acids, aqueous salt solutions, ethanol, glycerol, and mixtures thereof.

3. The composition as recited in claim 1 wherein the carrier solvent comprises a liquid selected from the group consisting of vegetable oils, isopropyl myristate, polyunsaturated fatty acids, polyoxyethylene (20) sorbitan monooleate, sorbitan trioleate, lecithin, triacetin, ethyl acetate, triethyl citrate, isopropanol, benzyl alcohol, and mixtures thereof.

4. The composition as recited in claim 1 wherein the carrier solvent comprises a medium chain triglyceride oil and the solvent comprises propylene glycol.

5. The composition as recited in claim 1 wherein the solvent has a log P value below 0 and the carrier solvent has a log P value above 0.25.

6. The composition as recited in claim 1 wherein the film-forming material is selected from the group consisting of polysaccharides, proteins, resins, waxes, tannins, lignin, lignocelluloses, polyphenols, and mixtures thereof.

7. The composition as recited in claim 1 wherein the film-forming material is selected from the group consisting of zein, whey proteins, soy proteins, caseins, maltodextrins, ethylcellulose, alginate, chitosan, shellac, tannic acid, gum arabic, and mixtures thereof.

8. The composition as recited in claim 1 wherein the solvent comprises a liquid selected from the group consisting of propylene glycol, a solutions of an organic acid, a salt solution, ethanol, glycerol, and mixtures thereof.

* * * * *